(12) United States Patent
Klisura et al.

(10) Patent No.: US 8,776,864 B2
(45) Date of Patent: *Jul. 15, 2014

(54) FULL CONTACT FLEXIBLE SEAL ASSEMBLY FOR HEAT EXCHANGER

(75) Inventors: Frank Klisura, Norco, CA (US); Stephan Hastings, Hemet, CA (US)

(73) Assignee: Paragon Airheater Technologies, Inc., Corona, CA (US)

( * ) Notice: Subject to any disclaimer, the term of this patent is extended or adjusted under 35 U.S.C. 154(b) by 746 days.

This patent is subject to a terminal disclaimer.

(21) Appl. No.: 12/542,542

(22) Filed: Aug. 17, 2009

(65) Prior Publication Data

US 2011/0036536 A1    Feb. 17, 2011

(51) Int. Cl.
*F23L 15/02*    (2006.01)
*F01D 11/02*    (2006.01)
*F16J 15/02*    (2006.01)
*F16J 15/08*    (2006.01)

(52) U.S. Cl.
USPC ............... 165/9; 277/355; 277/644; 277/654

(58) Field of Classification Search
USPC .................. 165/8, 9; 277/355, 644, 653, 654
See application file for complete search history.

(56) References Cited

U.S. PATENT DOCUMENTS

| | | | |
|---|---|---|---|
| 2,517,512 A | 8/1950 | Tigges et al. | |
| 2,549,583 A | 4/1951 | Eckersley | |
| 2,680,598 A | 6/1954 | Trulsson et al. | |
| 2,684,230 A | 7/1954 | Hammond | |
| 2,761,654 A | 9/1956 | Valvo | |
| 2,766,970 A | 10/1956 | Horn | |
| 2,874,939 A | 2/1959 | Rahr et al. | |
| 3,011,766 A | 12/1961 | Hess | |
| 3,016,231 A | 1/1962 | Muller | |
| 3,113,526 A | 12/1963 | Paschke | |
| 3,692,097 A | 9/1972 | Penny | |
| 3,698,429 A | 10/1972 | Lowe et al. | |
| 3,703,206 A | 11/1972 | Barnard | |
| 3,730,538 A | 5/1973 | Silverstone et al. | |

(Continued)

FOREIGN PATENT DOCUMENTS

GB    2250790    6/1992

OTHER PUBLICATIONS

Final Office Action mailed on Feb. 14, 2012 in U.S. Appl. No. 11/951,255.

(Continued)

*Primary Examiner* — Allana Lewin
*Assistant Examiner* — Travis Ruby
(74) *Attorney, Agent, or Firm* — Knobbe Martens Olson & Bear, LLP (57) ABSTRACT

A seal assembly for a regenerative heat exchanger can include a primary sealing member with a mounting base and a flexible contact portion that defines a first distance between a proximal edge of the mounting base and a contact edge of the flexible contact portion, the first distance being generally constant along the length of the primary sealing member. The seal assembly can also include a second member with a mounting portion and a cantilevered portion that defines a second distance between a proximal edge of the mounting portion and a distal edge of the cantilevered portion, the second distance being generally constant along the length of the second member. The first distance is greater than the second distance by a predetermined amount so as to limit the preload flexure of the flexible contact portion against a sector plate of the heat exchanger when the seal assembly is installed in the regenerative heat exchanger.

17 Claims, 7 Drawing Sheets

(56) References Cited

U.S. PATENT DOCUMENTS

| | | |
|---|---|---|
| 3,845,545 A | 11/1974 | Surrall et al. |
| 3,882,927 A | 5/1975 | Penny |
| 3,913,926 A | 10/1975 | Rao |
| 3,954,135 A | 5/1976 | Hewlitt |
| 3,977,465 A | 8/1976 | Tank |
| 4,056,141 A | 11/1977 | Sakaki |
| 4,084,634 A | 4/1978 | Handa |
| 4,098,323 A | 7/1978 | Wiegard et al. |
| 4,143,882 A | 3/1979 | Kobayashi |
| 4,173,252 A | 11/1979 | Sakaki et al. |
| 4,433,848 A | 2/1984 | Williams |
| 4,593,750 A | 6/1986 | Finnemore |
| 4,673,026 A | 6/1987 | Hagar et al. |
| 4,791,980 A | 12/1988 | Hagar et al. |
| 4,940,080 A | 7/1990 | Reeves et al. |
| 4,997,028 A | 3/1991 | Townsend |
| 5,005,634 A | 4/1991 | Reeves et al. |
| 5,137,078 A | 8/1992 | Borowy |
| 5,228,703 A | 7/1993 | White |
| 5,542,684 A | 8/1996 | Squirrell |
| 5,657,998 A | 8/1997 | Dinc et al. |
| 5,697,619 A | 12/1997 | Fierle |
| 5,881,799 A | 3/1999 | Kozacka et al. |
| 5,950,707 A | 9/1999 | Kozacka et al. |
| 6,598,664 B2 | 7/2003 | Fierle et al. |
| 6,789,605 B1 | 9/2004 | Kaser |
| 7,059,386 B1 | 6/2006 | Kaser |
| 7,231,958 B1 | 6/2007 | Kaser et al. |
| 2009/0145574 A1 | 6/2009 | Klisura |
| 2011/0037236 A1 | 2/2011 | Klisura et al. |

OTHER PUBLICATIONS

U.S. Appl. No. 12/542,557, filed Aug. 17, 2009, Klisura, Frank et al.
MacDuff, E.J., Clark, ND., "Ljungstrom Air Preheater Design and Operation", Combustion; Jan. and Mar. 1976, pp. 7-11.
Non-final Office Action mailed on Jul. 29, 2011 in U.S. Appl. No. 11/951,255.
Non-final Office Action mailed on Oct. 3, 2011 in U.S. Appl. No. 12/542,557.

FULL CONTACT FLEXIBLE SEAL ASSEMBLY FOR HEAT EXCHANGER

CROSS-REFERENCE TO RELATED APPLICATIONS

This application is related to U.S. application Ser. No. 12/542,557, filed Aug. 17, 2009, titled "FULL CONTACT FLEXIBLE SEAL ASSEMBLY FOR A HEAT EXCHANGER," the entire contents of which are incorporated by reference herein and should be considered a part of this specification.

BACKGROUND OF THE INVENTION

1. Field of the Invention

The present invention relates to heat exchange technology and, in particular, relates to an improved sealing component that may be used to reduce leakage between a hot gas conduit and a cold air conduit of a regenerative heat exchanging system.

2. Description of the Related Art

Conventional regenerative heat exchangers are used to provide preheated air to heavy machinery, such as a fuel burning power plant, and may be used with various types of machinery that exhaust hot gas and operate more efficiently when supplied with preheated air, such as, for example, chemical processors, refineries, pulp and paper mills, and ships. Typically, two fluid stream passages extend through the heat exchanger. The first passage may include a hot gas conduit that communicates with a hot exhaust outlet of the power plant. Hot exhaust gases flow from the power plant exhaust into the hot gas conduit of the heat exchanger. The second passage may include a cold air conduit that communicates with a cool air intake passage of the power plant. Cold air conduit feeds pressurized air into the intake passage of the power plant. As is known in the art, regenerative heat exchangers extract heat from the exhaust gases of the fuel burning power plant and transfer the heat to the cool air conduit.

As is also known in the art, leakage between the hot gas conduit and the cold air conduit reduces the thermal efficiency of heat exchangers. It is therefore desirable to provide a sealing mechanism between hot and cold conduits so that gas does not leak between the hot gas conduit and the cold air conduit. Therefore, seals may be mounted at the junctions between the movable heat exchanging body and the housing of the heat exchanging apparatus. Unfortunately, conventional seals have many disadvantages. For example, seals are typically exposed to harsh operating conditions, such as erosive fly ash and soot. As the heat exchanging body moves with respect to the housing or vice versa, the seals are also exposed to mechanical abuse because the seals are positioned to maintain sliding contact with the sealing surfaces. Consequently, the seals wear down quickly.

Further, the high operating temperatures of the heat exchanging apparatus expose the seals to thermal stresses which often cause the seals to warp. The high operating temperature also causes thermal distortions in the shape of the structural members of the heat exchanging apparatus, such as the housing and center shaft. The distortions in the shape of the seals and the structural members affect the clearance between the seals and the sealing surfaces, often resulting in leakage paths between the hot gas conduit and the cold air conduit. Such leakage paths typically reduce the thermal efficiency of the heat exchanging apparatus and also reduce the overall efficiency of the system.

Conventional seal designs do not adequately address these problems. Some seals are made from relatively thick metal which holds up well against corrosion and mechanical abuse. However, such seals are not very flexible and often lose contact with the sealing surface when the structural members of the heat exchanging apparatus thermally distort. Other seals are extremely flexible so that they initially offer better sealing characteristics by expanding or contracting when the structural members thermally distort to maintain contact with the sealing surface. However, such seals hold up poorly to corrosion and mechanical abuse.

Certain prior art seals have been equipped with flexible portions that allow the seal to flex in response to deformations in the heat exchanger. For instance, U.S. Pat. No. 5,950,707 discloses a seal having resilient components that allow for flexible deformations. However, such seals may fracture during excessive torque loads when exposed to very high differential pressures. As a result, stress fractures may allow gas leakage between conduits.

Additionally, flexible seals are sometimes subjected to excessive preloading during installation, causing increased stress on the seal during operation, which can shorten the life of the seal.

Therefore, there exists a need for an improved resilient seal that can be used in conjunction with heat exchanging systems to reduce the adverse effects of rotational stress loads, and certain applications with additional stress caused by high differential pressures, so as to substantially reduce the likelihood of leakage between hot and cold conduits of the heat exchanger, as well as that can inhibit the over-flexing of the seal during installation and operation of the heat exchanging system.

SUMMARY OF THE INVENTION

In accordance with one embodiment, a seal assembly for use in a regenerative heat exchanger is provided. The heat exchanger has a housing and a heat exchanging body disposed within the housing, one or both of the heat exchanging body and housing configured to rotate about an axis. The seal assembly is configured to contact the housing during operation of the regenerative heat exchanger to substantially seal a hot gas conduit from a cold air conduit. The seal assembly comprises a primary sealing member comprising a mounting base and a flexible contact portion with a contact edge configured to resiliently contact a sector plate of the housing when the primary sealing member is mounted to the heat exchanging body via the mounting base. The primary sealing member defines a first distance between a proximal edge of the mounting base and the contact edge, the first distance being generally constant along the length of the primary sealing member. The seal assembly further comprises a second member comprising a mounting portion and a cantilevered portion with a front face configured to face airflow and gas flow during operation of the regenerative heat exchanger and a rear face that faces the flexible contact portion and defines a gap therebetween. The second member defines a second distance between a proximal edge of the mounting portion and a distal edge of the cantilevered portion, the second distance being generally constant along the length of the second member. The mounting portion overlaps with the mounting base such that the mounting portion and mounting base are generally coextensive. The first distance is greater than the second distance by a predetermined amount so as to limit the flexure of the flexible contact portion against the sector plate below a predetermined flexure amount when the seal assembly is installed in the regenerative heat exchanger.

In accordance with another embodiment, a seal assembly for use in a regenerative heat exchanger is provided. The heat exchanger has a housing and a heat exchanging body disposed within the housing, one or both of the heat exchanging body and housing configured to rotate about an axis. The seal assembly is configured to contact the housing during operation of the regenerative heat exchanger to substantially seal a hot gas conduit from a cold air conduit. The seal assembly comprises a primary sealing member comprising a mounting base and a flexible contact portion with a contact edge configured to resiliently contact a sector plate of the housing when the primary sealing member is mounted to the heat exchanging body via the mounting base. The primary sealing member defines a first distance between a proximal edge of the mounting base and the contact edge, the first distance being generally constant along the length of the primary sealing member. The seal assembly further comprises an auxiliary sealing member comprising a mounting portion and a cantilevered portion with a front face configured to face airflow and gas flow during operation of the regenerative heat exchanger and a rear face that faces the flexible contact portion and defines a gap therebetween. The second member defines a second distance between a proximal edge of the mounting portion and a distal edge of the cantilevered portion, the second distance being generally constant along the length of the second member. The mounting portion overlaps with the mounting base such that the mounting portion and mounting base are generally coextensive. The first distance is greater than the second distance by a predetermined amount of between about 0.1 inches and about 3 inches so as to limit the flexure of the flexible contact portion against the sector plate below a predetermined flexure amount when the seal assembly is installed in the regenerative heat exchanger.

In accordance with another embodiment, a seal assembly for use in a regenerative heat exchanger having a housing and a heat exchanging body disposed within the housing is provided. One or both of the heat exchanging body and housing are configured to rotate about an axis, the seal assembly configured to contact the housing during operation of the regenerative heat exchanger to substantially seal a hot gas conduit from a cold air conduit. The seal assembly comprises a sealing member comprising a mounting base and a flexible contact portion with a contact edge configured to resiliently contact a sector plate of the housing when the primary sealing member is mounted to the heat exchanging body via the mounting base. The seal assembly also comprises a curvilinear support comprising a mounting section and a curved extended portion with a predetermined curvature configured to gradually come into contact with the flexible contact portion as flexion of the flexible contact portion is increased, thereby gradually moving a flex point of the flexible contact portion toward the contact edge and gradually increasing a spring constant of the flexible contact portion. The mounting section overlaps with the mounting base such that the mounting section and mounting base are generally coextensive.

In accordance with another embodiment, a seal assembly for use in a regenerative heat exchanger having a housing and a heat exchanging body disposed within the housing is provided. One or both of the heat exchanging body and housing are configured to rotate about an axis, the seal assembly configured to contact the housing during operation of the regenerative heat exchanger to substantially seal a hot gas conduit from a cold air conduit. The seal assembly comprises a sealing member comprising a mounting base and a flexible contact portion with a contact edge configured to resiliently contact a sector plate of the housing when the primary sealing member is mounted to the heat exchanging body via the mounting base. The seal assembly also comprises a curvilinear support comprising a mounting section and a curved extended portion with a predetermined curvature defined by an elliptical equation and configured to gradually come into contact with the flexible contact portion as flexion of the flexible contact portion is increased, thereby gradually moving a flex point of the flexible contact portion toward the contact edge and gradually increasing a spring constant of the flexible contact portion. The mounting section overlaps with the mounting base such that the mounting section and mounting base are generally coextensive.

BRIEF DESCRIPTION OF THE DRAWINGS

These and other objects and advantages of the present invention will become more fully apparent from the following description taken in conjunction with the accompanying drawings. The illustrations are intended to illustrate, but not to limit, the invention.

DETAILED DESCRIPTION OF THE PREFERRED EMBODIMENTS

Figure 1:
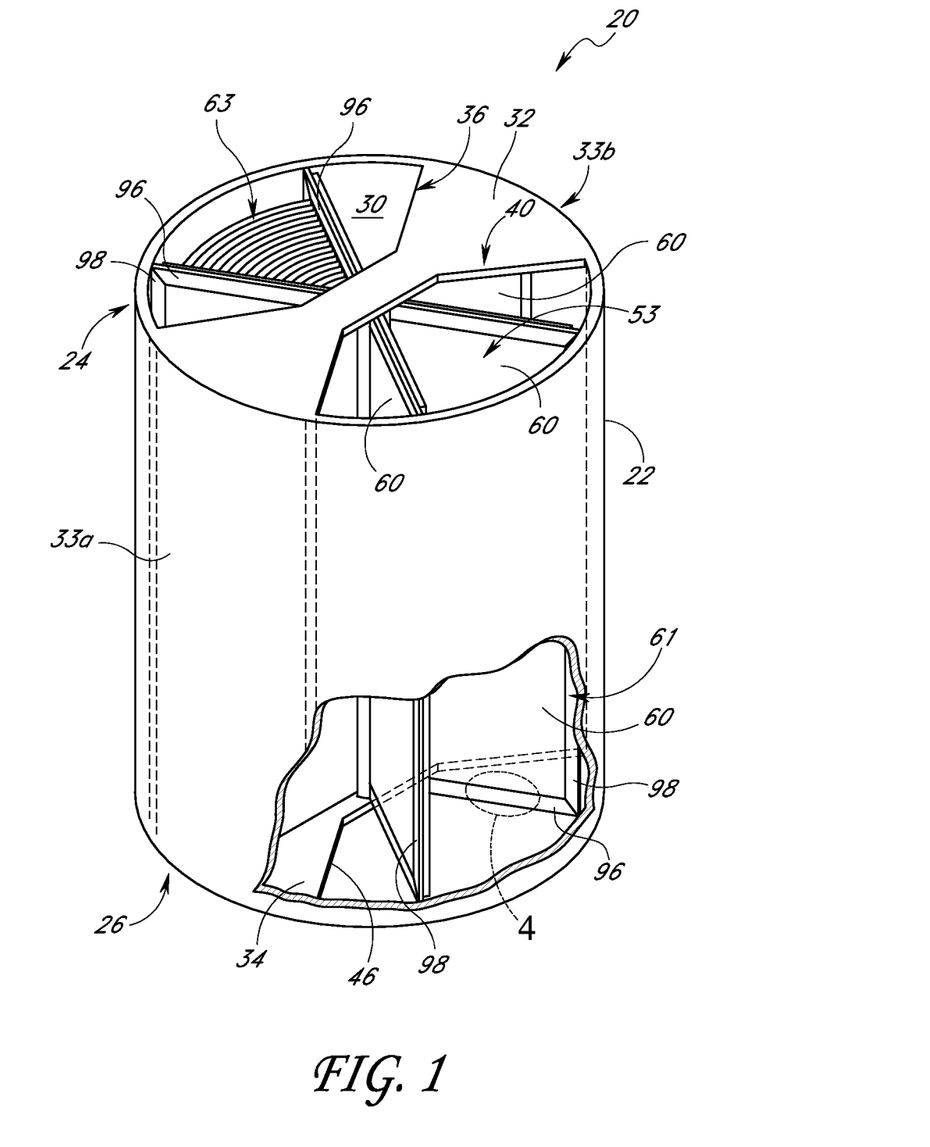
FIG. 1 is a schematic perspective view of one embodiment of a heat exchanger incorporating a self-adjusting seal assembly in accordance with one embodiment.
Figure 2:
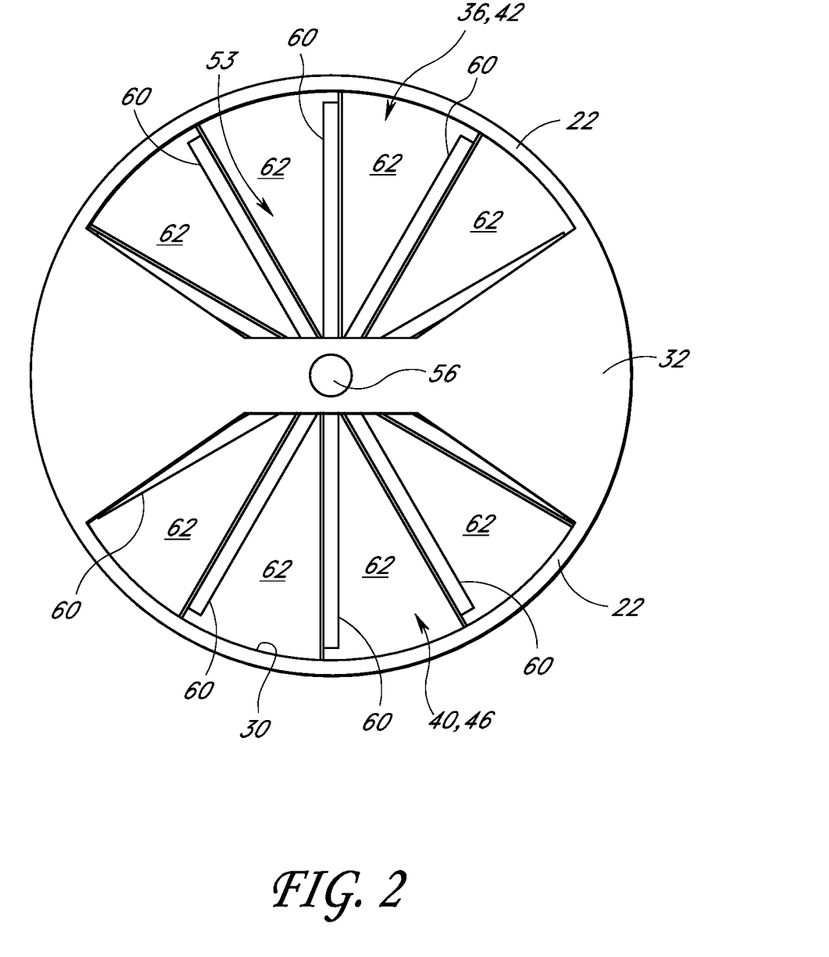
FIG. 2 is a schematic top view of the heat exchanger of FIG. 1.

Reference will now be made to the drawings wherein like numerals refer to like parts throughout. FIG. 1 is a perspective view of one embodiment of a regenerative heat exchanging apparatus (or heat exchanger) 20 in which seal assemblies 96, 98 (shown in FIGS. 1, 3) are used. FIG. 2 illustrates a top view of the heat exchanging apparatus 20 of FIG. 1. The heat exchanging apparatus 20 includes a housing 22 that can have a substantially cylindrical shape. The housing 22 has a top end 24 and a bottom end 26. As used herein, the words "top" and "bottom" are with respect to the drawings and are not intended to limit the scope of the invention. In one embodiment, the heat exchanging apparatus 20 can be a Ljungstrom™-type Air Preheater. However, the heat exchanging apparatus 20 can be any suitable regenerative heat exchanger (e.g., Rothemuhle®-type Regenerative Air Preheater). Further details on regenerative heat exchangers and associated members can be found in U.S. Pat. No. 5,950,707, issued Sep. 14, 1999, which is hereby incorporated by reference in its entirety and should be considered a part of this specification.

As illustrated in FIGS. 1 and 2, a movable heat exchanging body or rotor 53 is rotatably positioned within the housing 22. The heat exchanging rotor includes a rotatable center shaft 56 that is preferably aligned with the axial centerline of the housing 22. A plurality of radial walls 60 extend radially outward from the center shaft 56. A first seal assembly 96 (e.g., a radial seal) can be mounted along each of the top and bottom edges of the radial walls 60. A second seal assembly 98 (e.g., an axial seal) can be mounted on the outer radial edge 61 of each of the radial walls 60. The axial seals 98 extend axially along the length of the housing 20.

In addition, the housing 22 has a side inner surface 30 that defines a hollow interior. The top and bottom ends 24, 26 of the housing 22 can include a top sector plate 32 and a bottom sector plate 34, respectively. The bottom sector plate 34 is preferably aligned with the top sector plate 32. Axial portions 33a and 33b of the housing 22 (indicated by dashed lines in FIG. 1) define axial sector plates of the assembly 20. The top sector plate 32, the bottom sector plate 34 and the axial sector plates 33a and 33b define the boundary, or interface, between the intake and outlet conduit of the regenerative air preheater.

In one aspect, the top sector plate 32 defines an intake or cool air aperture 36 that allows cool air to be passed into the interior of the heat exchanging apparatus 20. An exhaust hot gas aperture 40 is also defined by the top sector plate 32 for allowing hot gas to be passed out of the heat exchanging apparatus 20. The bottom sector plate 34 also defines an intake aperture 42 that is aligned below the intake aperture 36. An exhaust aperture 46 on the bottom end 26 is aligned directly below the exhaust aperture 40. Those skilled in the art will appreciate that the location of the inlets and outlets of the heat exchanging apparatus 20 may be reversed without departing from the scope of the present invention. Furthermore, the axis of the heat exchanging apparatus 20 is not limited to a vertical orientation as shown in FIG. 1, but could also be oriented horizontally or at any of a wide variety of orientations.

Figure 3:
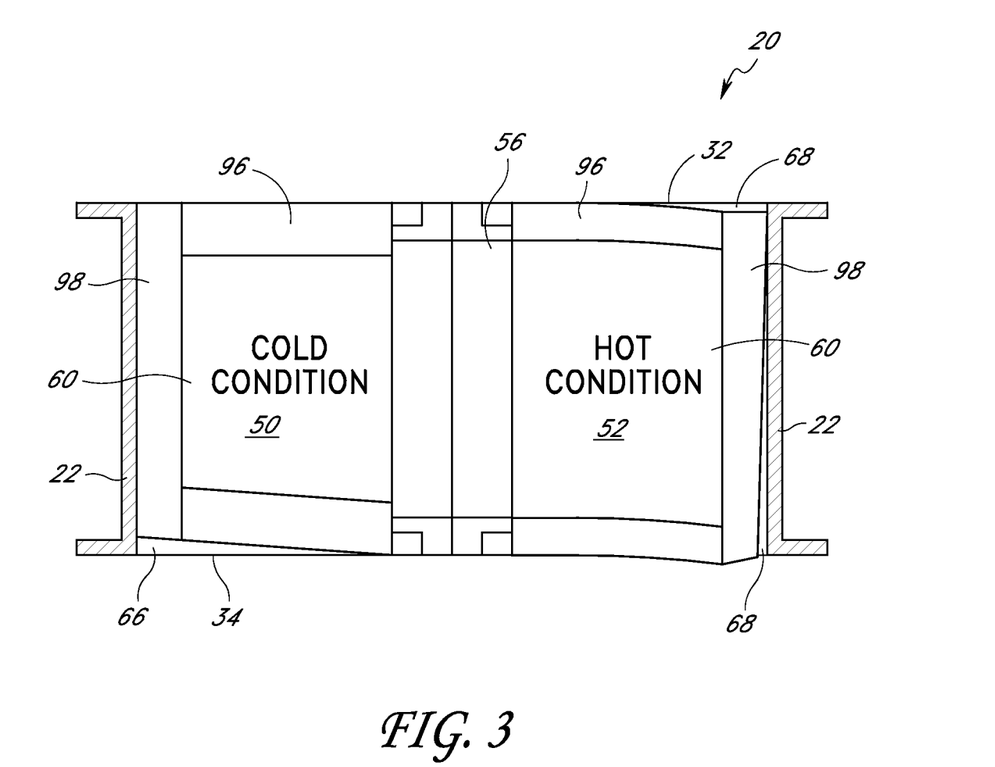
FIG. 3 is a schematic cross-sectional side view of the heat exchanger of FIG. 1.

The interior volume of the housing 22 between the top intake aperture 36 and bottom intake aperture 42 defines an intake conduit 50 (FIG. 3). During operation of the heat exchanging apparatus 20, air can be fed through the intake conduit 50 into a power plant (not shown), as described below. Similarly, the top exhaust gas aperture 40 and the bottom exhaust aperture 46 collectively define an exhaust conduit 52 therebetween that extends within the interior of the housing 22 from the top to the bottom of the heat exchanging apparatus 20. Hot exhaust gases are fed from the power plant through the exhaust conduit 52 during operation of the heat exchanging apparatus, as described below.

In one embodiment, the radial seals 96 are positioned on the radial walls 60 so that the outer edges of the radial seals 96 contact the inner surfaces of the sector plates 32 and 34 when the radial walls 60 are positioned between the sector plates 32 and 34. In this manner, the radial seals 96 provide a seal between the intake conduit 50 and the exhaust conduit 52, as described below. In addition, the axial seals 98 may be positioned such that the outer edges of the axial seals 98 contact the side inner surface 30 of the axial sector plates 33a and 33b. Advantageously, the axial seals 98 reduce leakage around the circumference of the housing 22 between the outer radial edges of the radial walls 60 and the side inner surface 30 of the axial sector plates 33a and 33b that divide the exhaust conduit 52 from the inlet conduit 50.

As further illustrated in FIG. 2, the radial walls 60 define a plurality of angular sectors 62 within the heat exchanging rotor 53. The angular sectors 62 extend from the top end 24 to the bottom end 26 of the heat exchanging apparatus 20 and communicate at either end with intake apertures 36, 42 and exhaust apertures 40, 46. Interposed between each radial wall 60 can be a core sector 63. In one embodiment, the core sector 63 can include thin corrugated (e.g., bellows-shaped) metal that can absorb heat from the exhaust of the power plant and then transfer this heat to the cool air in the intake conduit 50 in a manner that will be described in greater detail below. For ease of illustration, the core sector 63 is shown in only one angular sector 62 (see FIG. 1). In one embodiment, a core sector 63 can be positioned in each of the angular sectors 62.

During operation of the heat exchanging apparatus 20 as a Ljungstrom™-type Air Preheater, the heat exchanging rotor 53 rotates about the center shaft 56 within the housing 22. As the heat exchanging rotor 53 rotates, the angular sectors 62 are alternately aligned with the cool air intake conduit 50 and the hot gas exhaust conduit 52. When aligned with the intake conduit 50, the tops and bottoms of the angular sectors 62 communicate with the top and bottom intake apertures 36 and 42, respectively. Similarly, when aligned with the exhaust conduit 52, the tops and bottoms of the angular sectors 62 communicate with the exhaust apertures 40 and 46. The angular sectors 62 thus function as passageways through which cool air or hot gas flows.

The heat exchanging apparatus 20 functions as a Ljungstrom™-type Air Preheater as follows. One end of the intake conduit 50 is connected to a supply of intake gas, such as air. The other end of the intake conduit 50 is connected to a destination location, such as the cool air inlet passage of a power plant (not shown). The exhaust conduit 52 is also connected to the destination location, such as a hot gas exhaust outlet of the power plant. Any type of piping or duct work known to those skilled in the art may be used to connect the power plant and air supply to the heat exchanging apparatus 20.

In one embodiment air can flow into the intake conduit 50 via the top intake aperture 36. The air flows through the particular angular sector 62 that is aligned with the intake conduit 50. The air then flows out of the heat exchanging apparatus 20 through the bottom intake aperture 42 and into the cool air intake passage of the power plant. The power plant exhausts hot gases into the hot gas conduit 52 through the bottom exhaust aperture 46. The hot gases pass through the particular angular sector 62 that is aligned with the exhaust conduit 52. The hot gases then flow out of the heat exchange apparatus 20 through the top exhaust aperture 40.

In one embodiment, the heat exchanging body 53 can continually rotate within the housing 22 as the above-described process occurs. Thus, each angular sector 62 alternately aligns with the cool air intake conduit 50 and the hot gas exhaust conduit 52 as the heat exchanging rotor 53 rotates. That is, the angular sectors 62 are cyclically exposed to the intake conduit 50 and the exhaust conduit 52. When a particular angular sector 62 is located between the sector plates 32 and 34, the radial seals 96 contact the inner surfaces of the sector plates 32, 34 to prevent leakage between the exhaust conduit 52 and the intake conduit 50. Similarly, the axial seals 98 contact the side inner surface of the axial sector plates 33a and 33b to prevent leakage around the circumference of the housing 22 between the exhaust conduit 52 and intake conduit 50.

When an angular sector 62 aligns with the exhaust conduit 52, the core material 63 in the angular sector 62 absorbs heat from the exhaust gas in a well known manner. The heat exchanging body 53 continues to rotate so that the particular angular sector 62 eventually becomes aligned with the cool air conduit 50. The heat collecting core 63 then releases heat into the air flowing through the cool air conduit 52 to thereby warm the air.

The heat exchanging apparatus 20 can also be used to illustrate the basic operation of other regenerative heat exchangers (e.g., a Rothemuhle®-type Regenerative Air Preheater). The basic structure in this type of preheater is similar to the structure in a Ljungstrom™-type preheater. However, in a Rothemuhle®-type Regenerative Air Preheater the heat exchanging body 53 is fixed and the housing 22 rotates about the center shaft 56. Alternatively, a portion of the housing 22 or the duct work connecting the heat exchanger 20 to the power plant and air supply could rotate. In a Rothemuhle®-type preheater, the intake conduit 50 and exhaust conduit 52 rotate with respect to the heat exchanging body so that the angular sectors 62 are cyclically exposed to hot exhaust gases and cool air.

In both embodiments of regenerative air preheater, the heat exchanging apparatus 20 transfers heat from the hot exhaust gases of the power plant to the cool air that is being supplied to the power plant. This increases the operating efficiency of the power plant.

FIG. 3 is a schematic side view of the heat exchanging apparatus 20 illustrating the thermal deformations that the structural members of the heat exchanging apparatus 20 undergo during operation. The transfer of heat from the hot gas conduit 52 to the cool air conduit 50 creates temperature gradients throughout the heat exchanging apparatus 20. These temperature gradients cause thermal distortions that may affect the shapes of the structural members, including the center shaft 56, the radial walls 60, the radial seals 96, and the axial seals 98. It should be appreciated that the thermal distortions of the various components of the heat exchanging apparatus 20 can affect the clearance between seals 96, 98 mounted to the heat exchanger and the sealing surfaces (i.e., the inner surfaces of the sector plates).

As is shown in FIG. 3, the thermal gradients within the heat exchanging apparatus 20 can cause the structural components of the heat exchanging apparatus 20 to warp in shape. The left side of the heat exchanging apparatus in FIG. 3 illustrates the shape of the various structural components of the heat exchanging apparatus in an initial cold condition. As shown, a clearance gap 66 is often provided to compensate for the structural distortion that occurs during operation. The right side illustrates the shape of the heat exchanging apparatus in a hot condition. As shown, the thermal distortion generated during the operation of the heat exchanging apparatus 20 causes the radial and axial seals 96, 98 to move away from the housing 22 (e.g., turndown) of the heat exchanging apparatus and create leakage gaps 68 between the seals 96, 98 and the housing 22. Consequently, gas leaks between the hot gas conduit 52 and the cool air conduit 50 through the leakage gaps 68. This is highly undesirable as it reduces the thermal efficiency of the heat exchanging apparatus 20.

Figure 4:
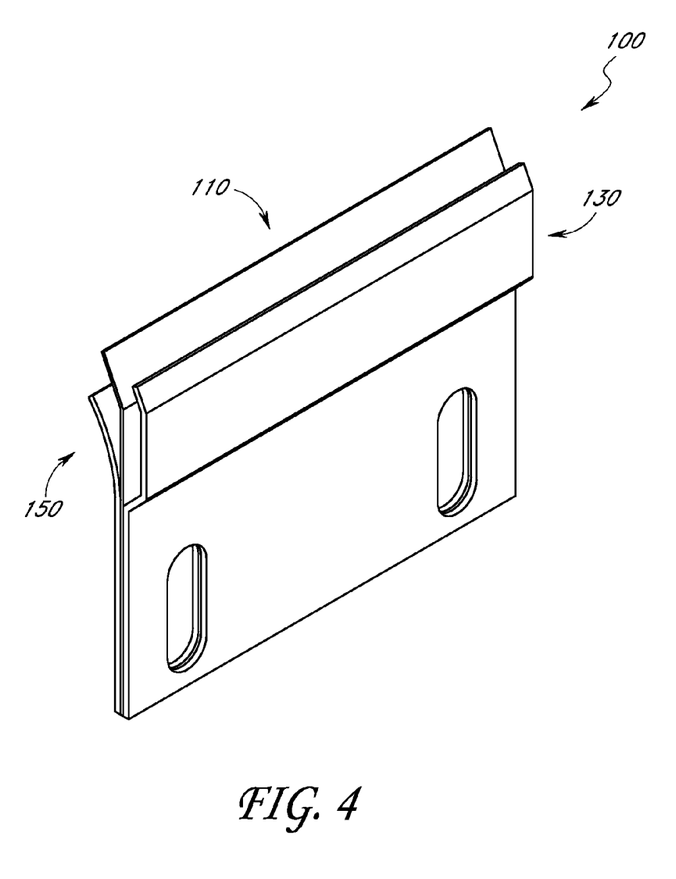
FIG. 4 is a schematic perspective front view of one embodiment of a seal assembly.
Figure 5:
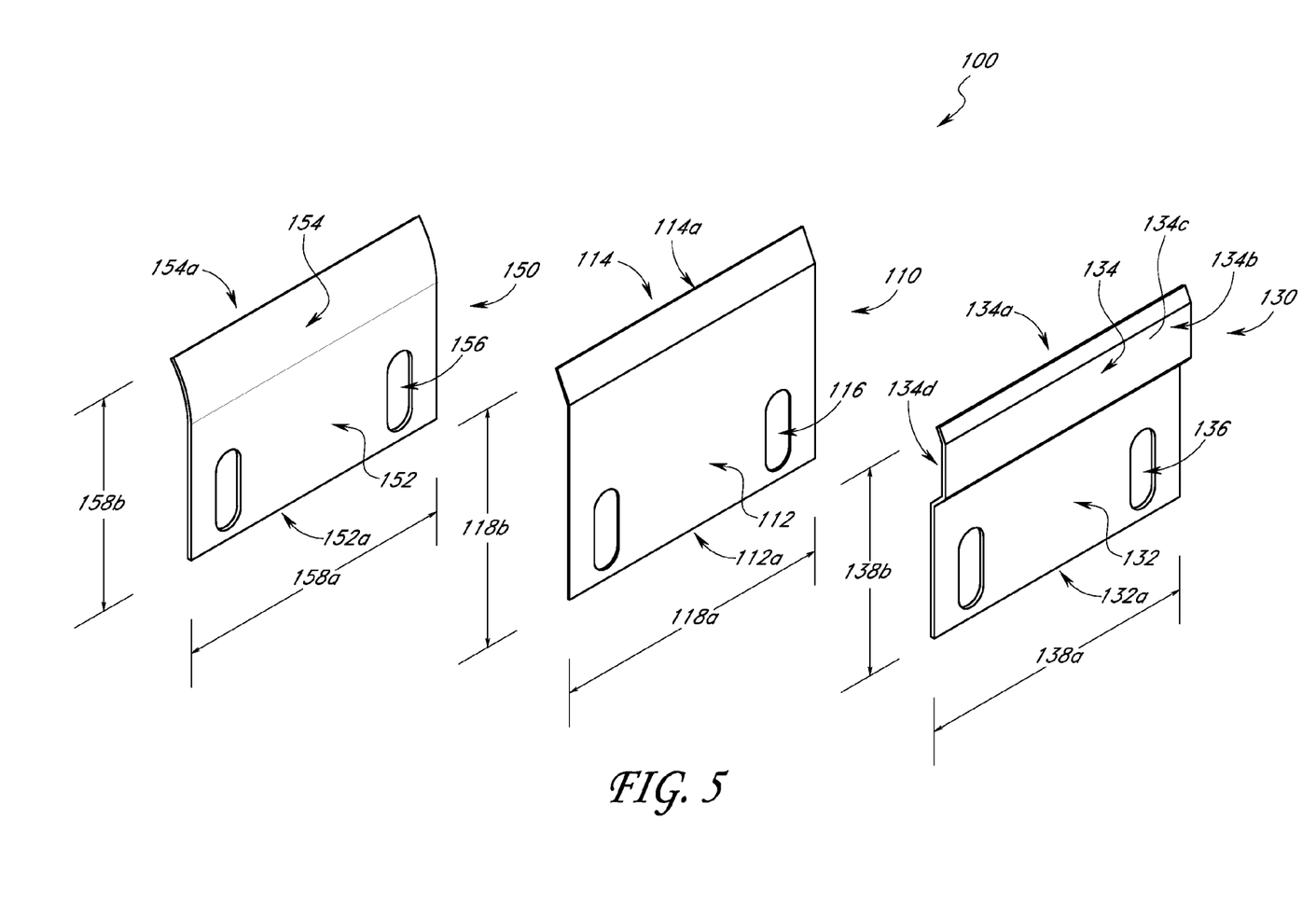
FIG. 5 is a schematic perspective exploded view of the seal assembly of FIG. 4.
Figure 6:
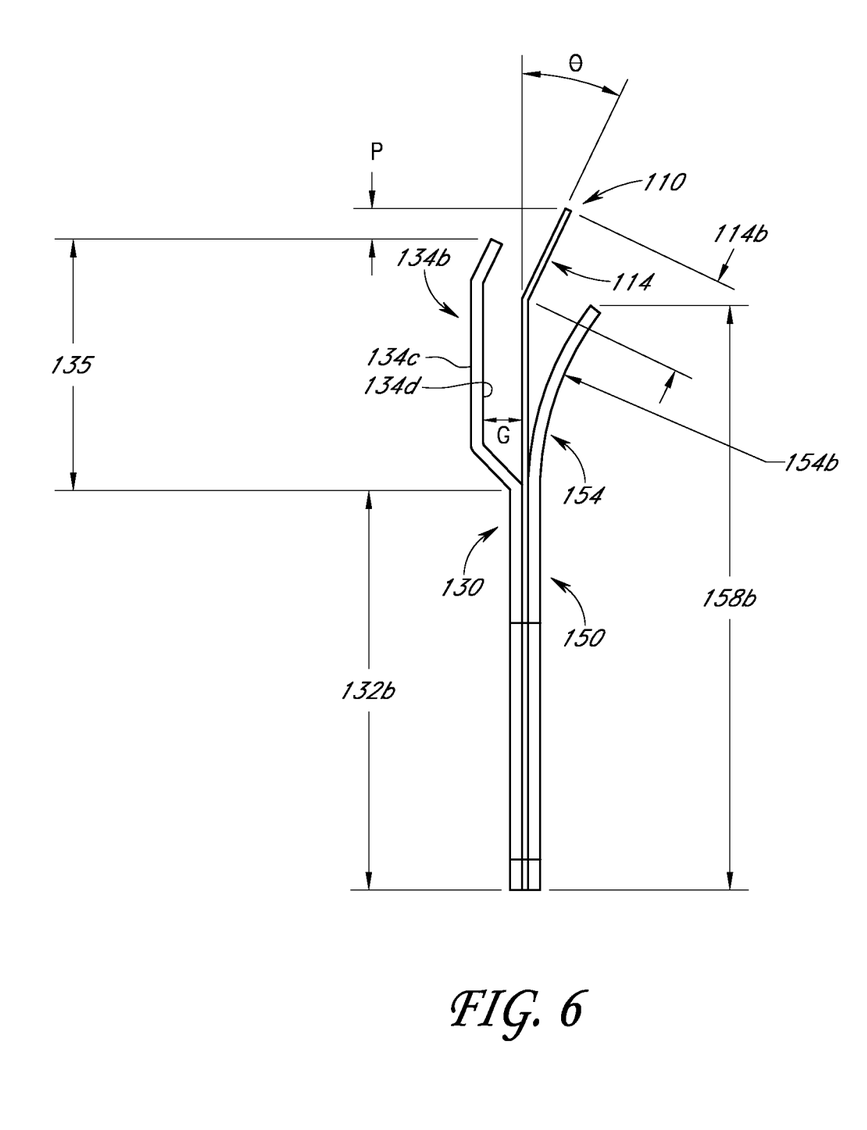
FIG. 6 is a schematic end view of the seal assembly of FIG. 4.

FIGS. 4-6 illustrate one embodiment of a seal assembly 100 for use in a regenerative heat exchanger 20. The seal assembly 100 can include a flexible seal member 110, a second member 130 and a curvilinear support 150.

The flexible seal member 110 can include a mounting base 112 with a proximal edge 112a and a flexible contact portion 114 attached to the mounting base 112 and extending to a contact or distal edge 114a. In a preferred embodiment, the mounting base 112 and flexible contact portion 114 are one piece (e.g., made of one sheet of metal) having substantially the same thickness. In another embodiment, the mounting base 112 is more rigid than the flexible contact portion 114. For example, in one embodiment, the thickness of the mounting base 112 can be greater than a thickness of the flexible contact portion 114. In another embodiment, the mounting base 112 can be made of a more rigid material than the flexible contact portion 114. In one embodiment, the thickness of the flexible seal member 110 can be between about 0.01 inches and about 0.1 inches, and more preferably between about 0.015 inches and about 0.05 inches.

In the illustrated embodiment, the flexible seal member 110 can also include one or more mounting slots 116 formed in the mounting base 112. Each slot 116 can be sized to receive one or more fasteners (e.g., bolts) therethrough to mount the flexible seal member 110 to, for example, the top and bottom edges of the radial walls 60 of the regenerative heat exchanger 20, such that the flexible seal members 110 function as radial seals.

In one embodiment, the flexible contact portion 114 can extend generally along the same plane as the mounting base 112. In another embodiment, the flexible contact portion 114 can have a length 114b of between about ¼ inch and about 2 inches, and more preferably about one inch. However, the length 114b can have other values. In one embodiment, the flexible contact portion 114 can extend along a plane generally at an angle θ of between about 5 degrees and about 45 degrees, and more preferably 25 degrees, relative to the plane of the mounting base 112. In still another embodiment, the flexible seal member 110 can include a bellows portion (not shown) between the mounting base 112 and the flexible contact portion 114. Further details on flexible seal member with a bellows portion can be found in U.S. Pat. No. 7,416,016, the entire contents of which are hereby incorporated by reference and should be considered a part of this specification.

With continued reference to FIGS. 4-6, the mounting base 112 can have a generally rectangular shape. Additionally, the flexible seal member 110 can have a length 118a of between about ten inches and about seventy inches, and more preferably between about one foot and about five feet, and can define a first distance or height 118b from the proximal edge 112a of the mounting base 112 to the contact or distal edge 114a of the flexible contact portion 114. Said first distance 118b can be between about three inches and about ten inches, and more preferably about six inches. However, the first distance 118b can have other values.

In the illustrated embodiment, the second member 130 can be an auxiliary seal member 130. The second member 130 can have a mounting portion 132 with a proximal edge 132a and a cantilevered or unsupported portion 134 attached to the mounting portion 132 and extending to a distal edge 134a. In a preferred embodiment, the mounting portion 132 and cantilevered portion 134 are one piece (e.g., made of one sheet of metal) having substantially the same thickness. The mounting portion 132 is preferably sized and shaped so as to generally overlap and be coextensive with the mounting base 112 of the flexible seal member 110. The mounting portion 132 can have a height 132b between the proximal edge 132a and the cantilevered portion 134. In one embodiment, the height 132b can be between about two inches and about five inches, and more preferably about three inches. However, the height 132b can have other values. The cantilevered portion 134 can have a height 135 between the mounting portion 132 and the distal edge 134a of between one inch and about four inches, and more preferably about two inches. However, the height 135 can have other values. In one embodiment, the mounting portion 132 and cantilevered portion 134 have generally the same rigidity. In another embodiment, the mounting portion 132 can be more rigid than the cantilevered portion 134.

In one embodiment, the second member 130 can also include one or more mounting slots 136 formed in the mounting portion 132 that generally align with the mounting slots 116 of the mounting base 112 when the mounting portion 132 is attached to the mounting base 112. In one embodiment, the mounting portion 132 can be attached to the mounting base 112 by welding. However, in other embodiments, the mounting portion 132 can be attached to the mounting base 112 via other suitable mechanisms (e.g., bolts, clamps, etc.) known in the art.

In the illustrated embodiment, the cantilevered portion 134 can generally extend along a plane that is offset from the plane of the mounting portion 132. Additionally, the cantilevered portion 134 can have a generally channel shaped cross-section with a generally planar portion 134b. where the distal edge 134a curves or is angled toward the flexible contact portion 114, such that a gap or slot G is defined between the cantilevered portion 134 and the flexible contact portion 114. In one embodiment, the distal edge 134 extends at an angle relative to the generally planar portion 134b, said angle being equal to the angle θ between the contact portion 114 and mounting base 112 of the flexible seal member. Preferably, the gap or slot G extends between the cantilevered portion 134 and the flexible contact portion 114 along the length of the seal assembly 100. In one embodiment, the gap G can be between about 0.1 inches and about 1 inch, and more preferably about 0.4 inches. In one embodiment, the gap G is generally uniform along the length of the seal assembly 100. In another embodiment, the gap G varies along the length of the seal assembly 100. The cantilevered portion 134 can have a front face 134c that faces the gas flow or air flow during operation of the regenerative heat exchanger 20, and a rear face 134d that faces the flexible contact portion 114.

In other embodiments, the cantilevered portion can have other cross-sectional shapes, such as a planar shape. In one embodiment, the cantilevered portion 134 can generally extend along the same plane as the mounting portion 132.

With continued reference to FIGS. 4-5, the mounting portion 132 can have a generally rectangular shape. Additionally, the second member 130 can have a length 138a generally equal to the length 118a of the flexible seal member 110, as well as define a second distance or height 138b from the proximal edge 132a of the mounting portion 132 to the distal edge 134a of the cantilevered portion 134. In one embodiment, the second distance 138b can be between about four inches and about nine inches, and more preferably about five inches. However, the second distance 138b can have other values.

In one embodiment, the first distance 118b can be greater than the second distance 138b by a predetermined amount. In one embodiment, the predetermined amount P can be between about 0.1 inches and about 3 inches, and more preferably about ¼ inch. However, the predetermined amount P can have other values. Said predetermined amount P can advantageously allow for the seal assembly 100 to be mounted to the radial walls 60 of the heat exchanging body 53 and set so that a desired pre-loading or flexure of the flexible contact portion 114 (e.g., against the sector plate 32, 34 of the housing 22 can be achieved. Moreover, said predetermined amount provided by the difference between the first distance and the second distance can advantageously inhibit the overloading of the flexible seal member 110 upon installation of the seal assembly 100, thereby avoiding the over-flexing of the flexible contact portion 114, thereby prolonging the operating life of the seal assembly 100. In one embodiment, the predetermined amount can be determined based on the particular operating conditions of the specific regenerative heat exchanger 20, and the first and second distances determined based on the predetermined amount. Such operating conditions specific to the regenerative heat exchanger 20 can include the amount of turndown expected in a heat exchanger unit of a given size and element depth, and the degree to which the sector plates 32, 34 are out of planar alignment (e.g., are offset from a plane). The more sector plates 32, 34 are out of planar alignment, the more positive contact by the flexible contact portion 114 will be needed to provide full contact between the flexible contact portion 110 and the sector plates 32, 34 throughout one revolution of the regenerative heat exchanger 20.

Additionally, the second member 130 can advantageously shield the flexible seal member 110 during operation of the regenerative heat exchanger 20, and can direct the flow of air, gas or ash particles away from the flexible contact portion 114, thereby reducing the erosion and stress of the flexible contact portion 114. Also, the second member 130 can shield the flexible seal member 110 during soot blowing of the heat exchange elements of the core sector 63 to remove particulates therefrom, thereby inhibiting the over-flexing of the flexible seal member 110.

Further, the second member 130 can advantageously function as a secondary seal member, where the distal edge 134a of the cantilevered portion 134 can be set a desired distance (e.g., between about 1/32 inch and about 3½ inches) from the surface of the sector plate 32, 34. Therefore, even if the flexible seal member 110 were to fail, the cantilevered portion 134 would substantially seal the hot gas conduit 52 from the cold air conduit 50 of the regenerative heat exchanger 20.

Additionally, in one embodiment, where the seal assembly 100 does not include the second member 130, the seal assembly 100 can include a doubler (not shown), which can be a heavy gage piece of steel (e.g., a steel plate with a thickness of between about 14 gage and 8 gage) disposed in front of the flexible seal member 110 and having a height equal to the height 132b of between about two inches and about five inches, more preferably about three inches. In another embodiment, the flexible contact portion 114 can be reinforced with a steel plate on either side of the flexible contact portion 114 to reduce wear on the flexible contact portion 114.

With continued reference to FIGS. 4-6, the curvilinear support 150 can include a mounting section 152 with a proximal edge 152a and a curved extended portion 154 attached to the mounting section 152 and extending to a distal edge 154a. In a preferred embodiment, the mounting section 152 and curved extended portion 154 are one piece (e.g., made of one sheet of metal) having substantially the same thickness. In one embodiment, the curvilinear support 150 can be made of a mild or cold rolled steel and have a thickness of between about 8 gage and 14 gage, and more preferably a thickness of between about 10 gage and about 12 gage. The mounting section 152 is preferably sized and shaped so as to generally overlap and be coextensive with the mounting base 112 and mounting portion 132, the mounting base 112 disposed between the mounting portion 132 and the mounting section 152. In one embodiment, the mounting section 152 and the curved extended portion 154 have generally the same rigidity. In another embodiment, the mounting section 152 is more rigid than the curved extended portion 154.

In one embodiment, the curvilinear support 150 can also include one or more mounting slots 156 formed in the mounting section 152 that generally align with the mounting slots 116, 136 of the mounting base 112 and mounting portion 132 when the mounting section 152 is attached to the mounting portion 132 and mounting base 112. In one embodiment, the mounting section 152 can be welded to the mounting portion 132 and the mounting base 112, the mounting base 112 disposed between the mounting portion 132 and the mounting section 152. In another embodiment, the mounting section 152 can be attached to the mounting portion 132 and mounting base 112 in any other suitable manner known in the art (e.g., with bolts, clamps, etc.)

Additionally, the curvilinear support 150 can have a length 158a generally equal to the length 138a, 118a of the second member 130 and flexible seal member 110, as well as define a third distance or height 158b from the proximal edge 152a of the mounting section 152 to the distal edge 154a of the curved extended portion 154. In one embodiment, the third distance 158b can be between about four inches and about nine inches, and more preferably about five inches. However, the third distance 158b can have other values.

In one embodiment, the curved extended portion 154 is defined by a cross-section having a predetermined curvature 154b. In one embodiment, the predetermined curvature 154b is uniform along a length 158a of the curvilinear support 150, so as to provide a generally uniform flexion resistance along the length of the seal assembly 100. In another embodiment the predetermined curvature 154b varies along the length of the curvilinear support 150, so as to provide a variable flexion resistance along the length of the seal assembly 100.

Figure 7A:
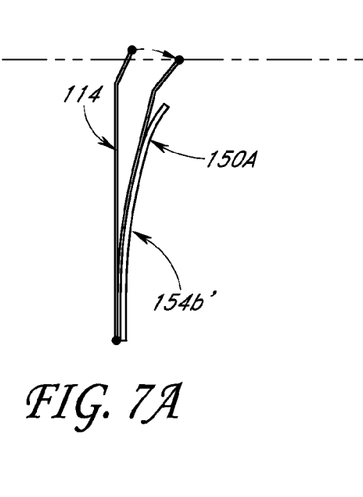
FIG. 7A is a schematic end view of one embodiment of a curvilinear support for use in the seal assembly of FIGS. 4-6, and its operation.
Figure 7B:
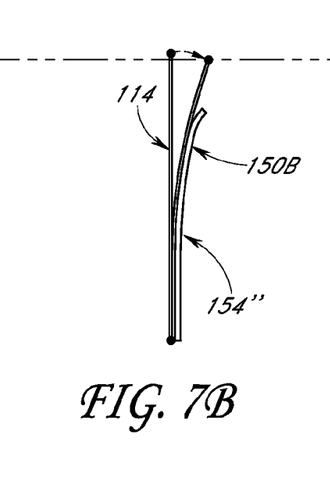
FIG. 7B is a schematic end view of another embodiment of a curvilinear support for use in the seal assembly of FIGS. 4-6, and its operation.
Figure 7C:
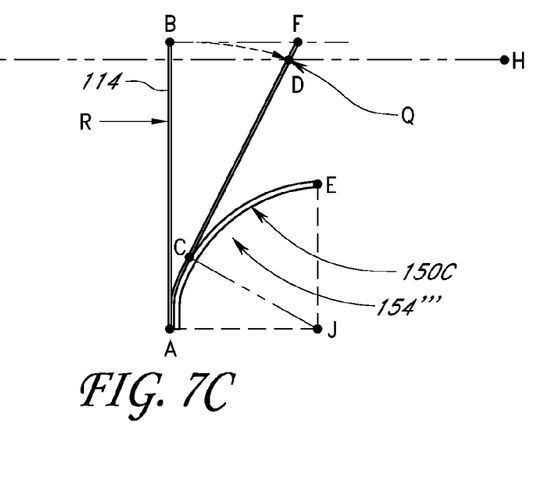
FIG. 7C is a schematic end view of another embodiment of a curvilinear support for use in the seal assembly of FIGS. 4-6, and its operation.

With reference to FIGS. 7A-7C, several embodiments of the curvilinear support 150 are illustrated, each having a different curvature 154a.

FIG. 7A shows a curvilinear support 150A having a predetermined curvature 154b' that is defined by an elliptical equation. The predetermined curvature 154b' can be defined by a typical equation for an ellipse having the form $Ax^2+Cy^2+Dx+Ey+F=0$, where A, C, D, E and F are constants. In one embodiment, the curved extended portion 154 can extend along about a quadrant of an ellipse defined by said equation. In the illustrated embodiment, the elliptical equation is such that the ratio of the width of the ellipse along the major axis relative to the width of the ellipse along the minor axis is about 4:1.

FIG. 7B shows a curvilinear support 150B having a predetermined curvature 154b'' that is also defined by an elliptical equation. In the illustrated embodiment, the elliptical equation is such that the ratio of the width of the ellipse along the major axis relative to the width of the ellipse along the minor axis is about 8:1. However, the ratio of the width along the major axis relative to the width along the minor axis can have other values (e.g., between 2:1 and 10:1, such as 4:1 or 7:1).

FIG. 7C shows a curvilinear support 150C with a predetermined curvature 154b''' that is defined by a circle having a radius of between about one inch and about ten inches. In another embodiment, the predetermined curvature 154b''' is defined by a circle having a radius of between about one inch and about three inches. However, the radius can have other values. In the illustrated embodiment, the flexible contact portion 114 moves from a relaxed (unflexed) position AB to a flexed position AD, where the contact edge 114a is in contact with the sector plate 32, 34. In FIG. 7C, plane GH represents the sector plate 32, 34, and distance DF represents the difference in height of the sector plate 32, 34 relative to the contact edge 114a of the flexible contact portion 114. Distance AE represents the curvature of the curved extended portion 154. Where the predetermined curvatures 154b is the predetermined curvatures 154b''' (i.e. defined by a circle), distance JA and JE represent the radius of the circle. Where the predetermined curvature 154 is the predetermined curvature 154b', 154b'' (i.e., defined by an ellipse), the distance JA can be the length of the minor axis of the ellipse and distance JE can be the length of the major axis of the ellipse. With continued reference to FIG. 7C, element C represents the position of the pivot point or edge as the flexible contact portion 114 comes in contact with the curvature of the curved extended portion 154b, and distance CD represents the length of the free or unsupported flexible contact portion 114 from the pivot point or edge C and the contact edge 114a. Also, distance AD represents the position of the flexible contact portion 114 when flexed, in the absence of the curved extended portion 154, when the flexible contact portion 114 contacts the sector plate 32, 34.

In another embodiment, the predetermined curvature 154b can be defined by a parabola with the equation $Ax^2+Bx+C=0$, where A, B and C are constants.

The curved extended portion 154 advantageously limits the deflection of the flexible contact portion 114 during operation of the regenerative heat exchanger 20. In a preferred embodiment, the predetermined curvature 154b, 154b', 154b'', 154b''' of the curved extended portion 154 of the curvilinear support 150, 150A, 150B, 150C is such that the flexible contact portion 114 gradually comes in contact with the curved extended portion 154 as the flexible contact portion 114 moves from the relaxed position AB (see FIG. 7C) to the flexed position AD (see FIG. 7C) where the contact edge 114a is in contact with the sector plate 32, 34. Said gradual contact between the flexible contact portion 114 and the curved extended portion 154 causes the flex pivot point or edge C (see FIG. 7C) of the flexible contact portion 114 to move toward the contact edge 154a of the curvilinear support 150 as flexion of the flexible contact portion 114 increases (see e.g., FIG. 7C), thereby reducing the free (unsupported) portion CD (see e.g., FIG. 7C) of the flexible contact portion 114 (i.e., the portion of the flexible contact portion 114 between the flex point or edge C and the contact edge 114a). That is, as the flexible contact portion 114 is flexed, the effective length thereof is shortened by the length of arc AC (see FIG. 7C). Additionally, as flexion of the flexible contact portion 114 is increased, the spring constant of the free portion CD increases, thereby increasing the stiffness of the flexible contact portion 114 and increasing a sealing force Q (see FIG. 7C) of the flexible contact portion 114, which resists the further flexion of the flexible contact portion 114. In one embodiment, the proportional increase in the spring constant and sealing force Q can be determined by the ratio of lengths AB/CD (see FIG. 7C), where CD is equal to length AB minus the length of the arc AC.

Accordingly, the predetermined curvature 154b, 154b', 154b'', 154b''' advantageously prevents the flexible contact portion 114 from over-flexing during operation of the regenerative heat exchanger 20, or during soot blowing or water washing operations on the seal assembly 100, by gradually increasing the stiffness of the free end or portion CD of the flexible contact portion 114.

Additionally, as the flexion of the flexible contact portion 114 increases and the flex point C moves toward the contact edge 114a, the area of the free end or portion CD that is exposed to the differential pressure generated by the gas/air flow decreases, thereby reducing an opening force R (see FIG. 7C) acting on the free end or portion CD of the flexible contact portion 114 against the sealing force Q (see FIG. 7C) of the flexible contact portion 114. The decrease in the opening force R can in one embodiment be determined by the reduction in net surface area of the free end or portion CD effected by the moving pivot point or edge C, and can be determined by the ratio CD/AB. Said sealing force Q is a function of at least the length AB of the flexible contact portion 114, the spring constant of the flexible contact portion 114, and the magnitude of the deflection of the flexible contact portion 114 when it is moved from the unflexed position to the flexed position. The sealing force Q is directly proportional to the amount of deflection and inversely proportional to the length AB of the flexible contact portion 114. In one embodiment, the sealing force Q linearly increases as the magnitude of the deflection of the flexible contact portion 114 increases, and linearly decreases as the length AB of the flexible contact portion increases.

The advantage provided by the curved extended portion 154 of the curvilinear support 150, as discussed above, as compared with a seal assembly without a moving pivot point or edge C can be expressed as an increase in the sealing force Q and equal to (AB/CD)*(1/(CD/AB)).

Though the operation of the curvilinear support 150 relative to the flexible contact portion 114 of the flexible seal member 110 is described above with respect to FIG. 7C one of ordinary skill in the art will recognize that the embodiments in FIGS. 7A and 7B would likewise result in an increase in the spring constant and stiffness of the free portion of the flexible contact portion 114 as flexure increases. Accordingly, the description above is not limited to any particular embodiment of a curvilinear support 150 or curvature 154$b$, 154$b'$, 154$b''$, 154$b'''$.

The seal assembly 100 can be made of any materials suitable for use in a regenerative heat exchanger 20. In one embodiment, the flexible seal member 110, the second member 130 and curvilinear support 150 can all be made of the same material. In another embodiment, at least two of the flexible seal member 110, the second member 130 and curvilinear support 150 can be made of the same material. In still another embodiment, the flexible seal member 110, the second member 130 and curvilinear support 150 can each be made of a different material. In one embodiment, one or more of the flexible seal member 110, the second member 130 and curvilinear support 150 can be made of steel (e.g., carbon steel, 300 series stainless steel (SS) such as 301 HH, 304 SS, 316 SS, and 321 SS fully annealed 316 stainless steel). In one embodiment, the flexible seal member 110 can be made of 301 HH stainless steel (½ Hard), and one or both of the second member 130 and curvilinear support 150 can be made of a mild A36 or equivalent cold rolled steel. In another embodiment, one or more of the flexible seal member 110, the second member 130 and curvilinear support 150 can be coated with a coating (e.g., a powder coating), for example, to inhibit corrosion thereof. Further details on corrosion inhibiting coatings can be found in U.S. application Ser. No. 10/793,182, filed on Mar. 3, 2004, which is incorporated herein by reference in its entirety and should be considered a part of this specification.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. For example, though the illustrated embodiment discloses a seal assembly with a flexible seal member, a curvilinear support and a second member or auxiliary sealing member, other embodiments may include any combination of these members. In one alternative embodiment, the seal assembly may only include the flexible seal member and curvilinear support. In another alternative embodiment, the seal assembly may include only the flexible seal member and auxiliary sealing member. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above.

What is claimed is:

1. A seal assembly for use in a regenerative heat exchanger having a housing and a heat exchanging body disposed within the housing, one or both of the heat exchanging body and housing configured to rotate about an axis, the seal assembly configured to contact the housing during operation of the regenerative heat exchanger to substantially seal a hot gas conduit from a cold air conduit, the seal assembly comprising:

a primary sealing member comprising a mounting base and a flexible portion with a contact edge at a distal end of the sealing member, the contact edge configured to resiliently contact a sector plate of the housing when the primary sealing member is mounted to the heat exchanging body via the mounting base, the primary sealing member defining a first distance between a proximal-most edge of the mounting base and the contact edge, the first distance being generally constant along the length of the primary sealing member;

a second member comprising a mounting portion and a cantilevered portion with a front face configured to face airflow and gas flow during operation of the regenerative heat exchanger and a generally concave rear face that faces the flexible portion of the primary sealing member, the cantilevered portion extending from a proximal end to a distal end on one side of a vertical plane defined by the mounting portion and having a first portion that extends outward away from the plane of the mounting portion, a second portion that extends along a plane offset from and parallel to the plane of the mounting portion, and a third portion that extends toward the plane of the mounting portion, the second member defining a gap of between 0.1 inches and 1 inch between at least the second portion and the primary sealing member when the primary sealing member is unflexed such that said second portion and primary sealing member do not contact or engage each other, the second member defining a second distance between a proximalmost edge of the mounting portion and a distalmost edge of the cantilevered portion, the second distance being generally constant along the length of the second member, the mounting portion overlapping with the mounting base such that the mounting portion and mounting base are generally coextensive;

wherein the first distance is greater than the second distance by a predetermined amount so as to limit the flexure of the flexible portion against the sector plate below a predetermined flexure amount when the seal assembly is installed in the regenerative heat exchanger.

2. The seal assembly of claim 1, wherein the second member is an auxiliary sealing member, the cantilevered portion configured to substantially seal the hot gas conduit from the cold air conduit during operation of the regenerative heat exchanger.

3. The seal assembly of claim 2, wherein the distalmost edge of the cantilevered portion is disposed a predetermined distance from the sector plate of the housing to substantially seal the hot gas conduit from the cold air conduit.

4. The seal assembly of claim 1, wherein at least a distal section of the flexible portion extends at an angle relative to the mounting base.

5. The seal assembly of claim 4, wherein at least a distal portion of the cantilevered portion extends at said angle relative to the mounting portion.

6. The seal assembly of claim 1, wherein the predetermined amount is about ¼ inch.

7. The seal assembly of claim 1, further comprising:
a curvilinear support comprising a mounting section and a curved extended portion, the mounting section overlapping with the mounting base and mounting portion such that the mounting section is generally coextensive with the mounting base and mounting portion, the mounting base disposed between the mounting section and the mounting portion,
wherein the curved extended portion has a predetermined curvature that defines a gap between the curvilinear support and the primary sealing member, the curved extended portion configured to contact the flexible portion of the primary sealing member as the primary sealing member flexes during operation of the regenerative heat exchanger thereby decreasing a size of said gap between the primary sealing member and the curvilinear support, the curved portion configured to move a flex point of the flexible portion toward the contact edge of the flexible portion as the flexure of the flexible portion increases, thereby increasing a spring constant of the flexible portion with the increased flexure thereof.

8. The seal assembly of claim 7, wherein the curved extended portion is configured to reduce a force generated by a static pressure of gas acting on the flexible portion, as the flexure of the flexible portion increases during operation of the regenerative heat exchanger.

9. The seal assembly of claim 1, wherein the primary sealing member is monolithic.

10. A seal assembly for use in a regenerative heat exchanger having a housing and a heat exchanging body disposed within the housing, one or both of the heat exchanging body and housing configured to rotate about an axis, the seal assembly configured to contact the housing during operation of the regenerative heat exchanger to substantially seal a hot gas conduit from a cold air conduit, the seal assembly comprising:
a primary sealing member comprising a mounting base and a flexible portion with a contact edge at a distal end of the primary sealing member, the contact edge configured to resiliently contact a sector plate of the housing when the primary sealing member is mounted to the heat exchanging body via the mounting base, the primary sealing member defining a first distance between a proximalmost edge of the mounting base and the contact edge, the first distance being generally constant along the length of the primary sealing member;
an auxiliary sealing member comprising a mounting portion and a cantilevered portion with a front face configured to face airflow and gas flow during operation of the regenerative heat exchanger and a rear face that faces the flexible portion of the primary sealing member, the cantilevered portion extending from a proximal end to a distal end on one side of a vertical plane defined by the mounting portion and having a first portion that extends outward away from the plane of the mounting portion, a second portion that extends along a plane offset from and parallel to the plane of the mounting portion such that a gap of between 0.1 inches and 1 inch is defined between at least the second portion and the primary sealing member when the primary sealing member is unflexed such that said second portion and primary sealing member do not contact or engage each other, and a third portion that extends toward the plane of the mounting portion, the second member defining a second distance between a proximalmost edge of the mounting portion and a distalmost edge of the cantilevered portion, the second distance being generally constant along the length of the second member, the mounting portion overlapping with the mounting base such that the mounting portion and mounting base are generally coextensive;
wherein the first distance is greater than the second distance by a predetermined amount of between about 0.1 inches and about 3 inches so as to limit the flexure of the flexible portion against the sector plate below a predetermined flexure amount when the seal assembly is installed in the regenerative heat exchanger.

11. The seal assembly of claim 10, wherein at least a distal section of the flexible portion extends at an angle relative to the mounting base.

12. The seal assembly of claim 11, wherein at least a distal portion of the cantilevered portion extends at said angle relative to the mounting portion.

13. The seal assembly of claim 10, wherein the predetermined amount is about ¼ inch.

14. The seal assembly of claim 10, further comprising:
a curvilinear support comprising a mounting section and a curved extended portion, the mounting section overlapping with the mounting base and mounting portion such that the mounting section is generally coextensive with the mounting base and mounting portion, the mounting base disposed between the mounting section and the mounting portion,
wherein the curved extended portion has a predetermined curvature that defines a gap between the curvilinear support and the primary sealing member, the curved extended portion configured to contact the flexible portion of the primary sealing member as the primary sealing member flexes during operation of the regenerative heat exchanger thereby decreasing a size of said gap between the primary sealing member and the curvilinear support, the curved portion configured to move a flex point of the flexible portion toward the contact edge of the flexible portion as the flexure of the flexible portion increases, thereby increasing a spring constant of the flexible portion with the increased flexure thereof.

15. The seal assembly of claim 14, wherein the curved extended portion is configured to reduce a force generated by a static pressure of gas acting on the flexible portion, as the flexure of the flexible portion increases during operation of the regenerative heat exchanger.

16. The seal assembly of claim 10, wherein the primary sealing member is monolithic.

17. The seal assembly of claim 10, wherein the rear face has a generally concave shape.

* * * * *

UNITED STATES PATENT AND TRADEMARK OFFICE
CERTIFICATE OF CORRECTION

| | | |
|---|---|---|
| PATENT NO. | : 8,776,864 B2 | Page 1 of 1 |
| APPLICATION NO. | : 12/542542 | |
| DATED | : July 15, 2014 | |
| INVENTOR(S) | : Frank Klisura | |

It is certified that error appears in the above-identified patent and that said Letters Patent is hereby corrected as shown below:

In the Specification

Column 9, line 8, delete "134b." and insert -- 134b, --, therefor.

Column 9, line 67, delete "more" and insert -- more the --, therefor.

Signed and Sealed this
Twenty-fourth Day of February, 2015

Michelle K. Lee
*Deputy Director of the United States Patent and Trademark Office*